April 28, 1936.　　H. K. RADER ET AL　　2,038,870

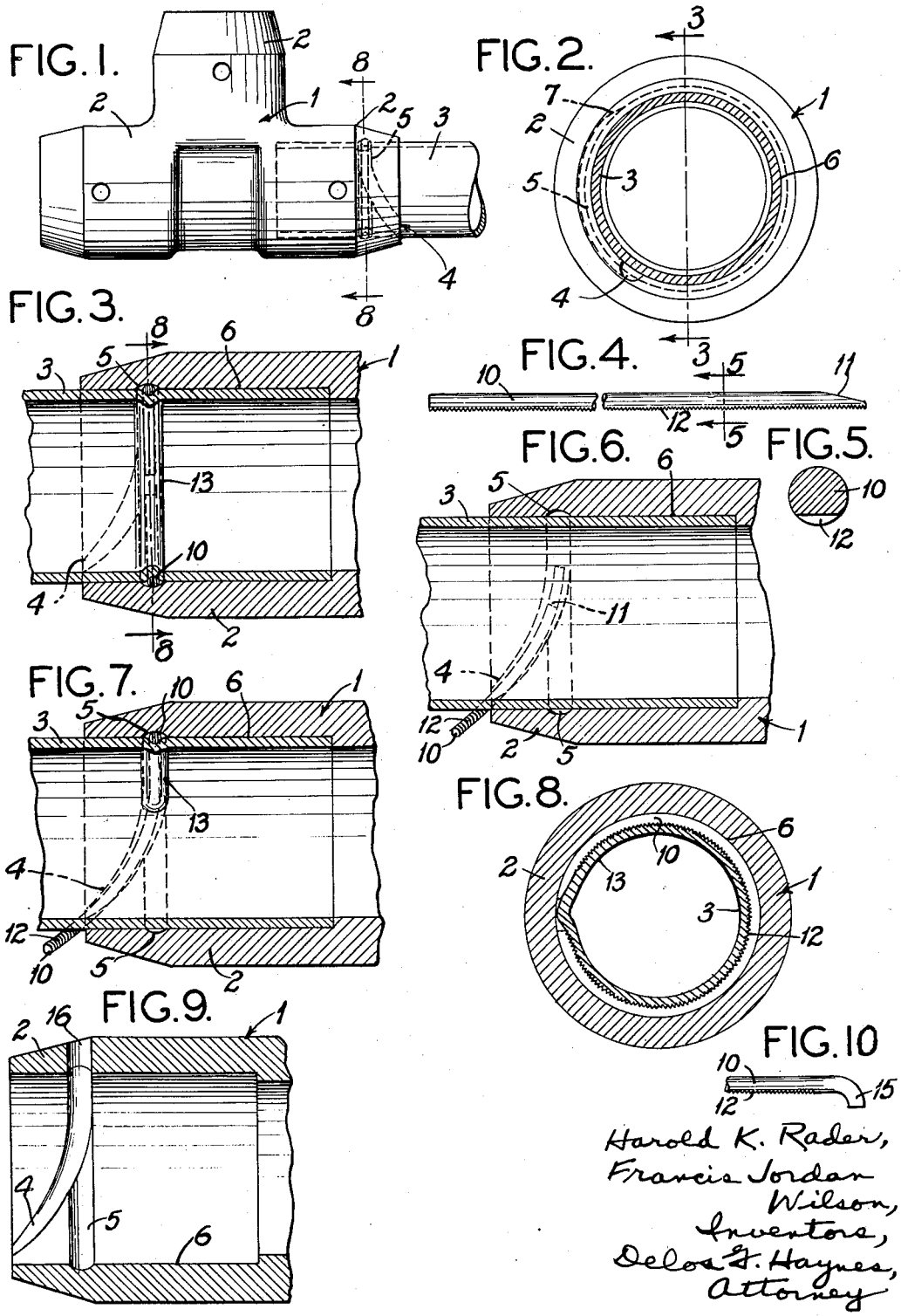

JOINT

Filed Oct. 21, 1935　　2 Sheets-Sheet 2

Harold K. Rader,
Francis Jordan Wilson,
Inventors,
Delos G. Haynes
Attorney

Patented Apr. 28, 1936

2,038,870

UNITED STATES PATENT OFFICE 2,038,870

JOINT

Harold K. Rader and Francis Jordan Wilson, Port Huron, Mich., assignors to Mueller Brass Co., Port Huron, Mich., a corporation of Michigan Application October 21, 1935, Serial No. 45,872

3 Claims. (Cl. 285—117)

This invention relates to joints and fittings, and with regard to certain more specific features, to joints and fittings for connecting together lengths of pipe and the like.

Among the several objects of the invention may be noted the provision of a pipe or like fitting which is adapted to produce an improved locked joint between the pipe and fitting; the provision of a fitting of the class described which, in addition to providing a locked joint, is adapted for the effectuation of a securely sealed joint; the provision of a fitting of the class described which may be assembled into a joint with minimum effort and maximum speed and facility; and the provision of a fitting of the class described which is relatively simple and economical to manufacture. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a side elevation of a T-fitting embodying the present invention, showing a pipe inserted and a joint made therewith;

Fig. 2 is a cross section of the fitting of Fig. 1 taken substantially along line 8—8, but prior to certain jointing operations;

Fig. 3 is a longitudinal section of the joint of Fig. 1;

Fig. 4 is an enlarged side elevation of a locking member;

Fig. 5 is an enlarged cross section of the locking member, taken substantially along line 5—5 of Fig. 4;

Fig. 6 is a view similar to Fig. 3, illustrating the initial positioning of the locking member;

Fig. 7 is a view similar to Figs. 3 and 6, illustrating a further stage in making the joint;

Fig. 8 is a cross section taken substantially along line 8—8 of Figs. 1 and 3;

Fig. 9 is a longitudinal section of a second embodiment of the invention;

Fig. 10 is a fragmentary view, similar to Fig. 4, showing an alternative form of the locking member;

Similar reference characters indicate corresponding parts throughout the several views of the drawings.

Figure 11:
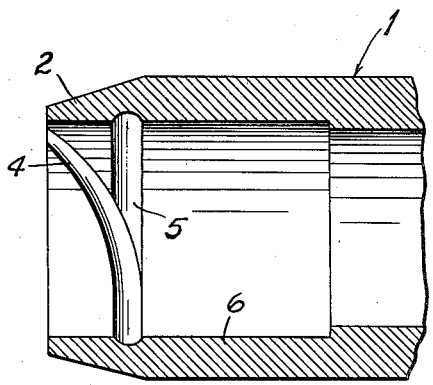
Fig. 11 is a view similar to Fig. 9, illustrating another embodiment of the invention; and, Fig. 12 is a view similar to Figs. 9 and 11, illustrating still another embodiment of the invention.

Referring now more particularly to Fig. 1, numeral 1 indicates a pipe fitting, which, for purpose of illustration, has been shown as a T. The T has been chosen for exemplary purposes only, and it is to be understood that the invention applies with equal facility to all classes of pipe fittings, as ells, couplings, crosses, nipples, adapters, caps, valve ends, and the like, the sole criterion being that the fitting must have a socket portion 2 which is adapted to telescopingly receive the length of pipe or the like which it is desired to connect thereto. The T-fitting illustrated, in accordance with its shape, has three such socket portions 2.

Basically, the fitting 1 is of the general type shown in Gresley et al. Patent Number 1,776,502, dated September 23, 1930. That is, it is a fitting designed particularly for use with unthreaded, relatively thin-walled pipe, which is usually made of copper. Such a pipe, for example, is indicated at numeral 3. In accordance with the teaching of the said Gresley patent, the joint effected with this fitting is made by telescoping the pipe 3 into one of the sockets 2, and thereafter introducing liquid solder or like sealing material through a sprue or feed-hole 4 into an internal groove 5 (see Fig. 2), whence it is fed by capillary attraction to the interface region between the pipe and fitting. It will be understood that the receiving portion of the socket 2 and the pipe 3 are so dimensioned that the clearance therebetween is of suitable size to induce such capillary flow of the liquid solder.

The present invention provides new means, in addition to the solder film described, whereby the pipe 3 is securely locked into the fitting 1.

Referring now more particularly to Fig. 2, numeral 6 indicates the inner smooth, cylindrical wall of the socket portion 2. Numeral 5, as has been intimated, indicates an interior annular groove which is formed on the inner wall 6 intermediate its ends. Numeral 4, as has likewise been intimated, indicates a sprue or solder feed-hole. The sprue 4 is of a special construction in the present invention. Instead of leading from the exterior side wall of the fitting 1 to the groove 5, this sprue 4 itself comprises a helical or sloping groove in the smooth wall 6 of the socket portion 2, leading from the end face thereof into the interior annular groove 5.

Referring now to Fig. 4, numeral 10 indicates a length of wire which is usually of circular cross section. The circular cross section is not essential to the present invention, but it has been found to operate advantageously with the curved cross section of the groove 5 indicated in Fig. 3. The length of the wire 10 is preferably slightly less than the circumferential length of the groove 5, for purposes which will be made apparent hereinafter. At one end of the wire 10 there is provided a tapered portion 11 (see Fig. 4). Along the entire length of the wire 10, on the side thereof opposite the tapered portion 11, there are provided corrugations or serrations 12. The serrations 12 are desirably sufficiently sharp so that they are able to bite into the metal of the pipe 3, as will be pointed out hereinafter. The shape of the serrations 12 is indicated in Fig. 5, which is an enlarged cross-sectional view of the wire 10.

It is preferable, both from the standpoint of ease of manufacture, and from the standpoint of more readily securing a good joint, that the serrations 12 extend the entire length of the wire 10. However, under certain circumstances this is not altogether necessary, and a short region of corrugations or serrations need only be provided near the tapered end 11.

Returning to the fitting 1 and the socket portion 2 thereof, it is to be pointed out that the depth of the annular groove 5 is less than the diameter of the wire 10, while the depth of the helical feed groove 4 is great enough to accommodate the entire diameter of the wire 10. At the region where the helical groove 4 joins the annular groove 5, the depth of the helical groove 4 is slowly reduced as indicated at numeral 7 in Fig. 2, until it finally equals the depth of the annular groove 5. The reasons for this relative dimensioning will be made apparent hereinafter.

The wire 10 constitutes the locking member of the present invention. Its application is indicated in Figs. 2, 6, 7, 3, and 8, in the order stated. Referring to Fig. 6 it will be seen that the pipe 3 is now shown as inserted into socket 2 of the fitting 1. The tapered end 11 of the wire 10 is now inserted through the helical feed groove 4 in such manner that it is tangential to the pipe 3 and the serrations 12 engage the side of the pipe 3. The wire 10 may readily be inserted to the extent illustrated in Fig. 6 because it will be remembered that the depth of the helical groove 4 is such that it readily passes the full diameter of the wire 10. However, when the tapered end 11 enters the portion 7 where the depth of the helical groove 4 is being reduced to the depth of the annular groove 5, it will wedge into position between the fitting and the pipe.

If the pipe 3 is now manually grasped, exteriorly of the fitting, and turned in a clockwise manner, it will be seen that the serrations 12 bite into the walls of said pipe, thereby dragging or pulling along the wire 10. The wire 10 is desirably made of a harder material than the pipe 3. For example, if the pipe 3 is copper, the wire 10 may be brass, steel, iron, or the like. Because of this relative difference in hardness, and because the diameter of the wire 10 is greater than the region provided for it by the depth of the annular groove 5, an annular groove 13 (see also Fig. 7), is forced into the pipe 3 as it is turned. When the pipe has made one complete revolution, to the position illustrated in Figs. 3 and 8, the groove 13 will likewise be annular, and extend completely therearound. Because of the thin walls of the pipe 3, the groove 13 is accompanied by a corresponding annular bead on the inner surface of the pipe 3. The wire 10 is now entirely within the fitting, and lying between oppositely facing annular grooves 5 in the fitting and 13 in the pipe. Because of the tight fit afforded, the pipe is thus securely locked in the fitting.

When the wire 10 has thus been entirely drawn into the fitting and the position in Figs. 3 and 8 achieved, liquid solder or similar sealing material may be fed in through the helical groove 4 to seal the joint. From Figs. 3 and 7, it will be seen that the wire 10 does not completely fill the annular groove 5; hence, the liquid solder may be introduced into the fitting through the helical groove 4 and may travel around the fitting through the annular groove 5, to spread by capillary attraction into the interface region in the same manner as set forth in the said Gresley et al. patent. By addition of said sealing material, the joint is made tight or is sealed, in addition to being locked.

A combination locked and sealed joint, such as that just described, is particularly useful, for example, in fire sprinkler installations where it is essential that the installation remain in position even though the temperature becomes sufficiently high to melt out the solder. With a joint as thus described, even if the solder or sealing material melts and runs out of the joint, a locked joint which is relatively tightly sealed is still maintained, and the pipe does not come out of the fitting. In many other circumstances, such a type of joint is desirable.

Fig. 10 illustrates a form of locking wire 10 which may be used in alternative manner to that shown in Fig. 4. In the Fig. 10 embodiment the tapered end 11 is dispensed with, while the analogous end of the wire 10 is bent down to form a short hook or ear or projection 15. In using this form of locking wire, a shallow hole is drilled into the side of the pipe as or before the pipe is positioned in the fitting. The end 15 of the wire 10 is then hooked into the hole, and the pipe 3 turned as in the previous embodiment. The engagement of the end 15 in the hole causes the wire 10 to be pulled into the joint and its final position is as illustrated in Fig. 3.

The taper 11 and the hooked end 15 thus both comprise means on the end of the wire 10 whereby it is attached to the pipe 3.

With the Fig. 10 embodiment, the serrations 12 are not as important as they are with the Fig. 4 embodiment, for the engagement between the end 15 and the hole in the pipe is usually sufficient to draw the entire length of the wire 10 into the fitting in making the joint. However, the serrations 12 when provided in the Fig. 10 embodiment, have an additive holding effect and are advantageously, though not necessarily, provided.

The locking wires shown in Figs. 4 and 10 are described and claimed in the copending application of the present applicant Wilson, Serial No. 69,891, filed March 20, 1936.

In Fig. 9 is illustrated an alternative embodiment of the invention where a separate solder feed hole or sprue 16 is provided. The sprue 16 communicates laterally through the side of the fitting, with the annular groove 5. In this respect, this fitting resembles the fitting of the said Gresley et al. patent. The helical groove 4 is now used only for feeding the locking wire into the fitting in assembling the joint while the sealing operation is performed by admitting the molten solder through the sprue 16. Of course, if desired, solder may be applied both at the sprue 16 and at the end opening of the helical groove 4.

In all of the embodiments shown, if the locking wire 10 is made sufficiently long, it can be so manipulated that a short length is left protruding from the opening of the helical groove 4 at the end of the fitting. Such a protruding end of wire serves as a signal that the joint is a locked one, in contradistinction to a simple soldered joint.

Figure 12:
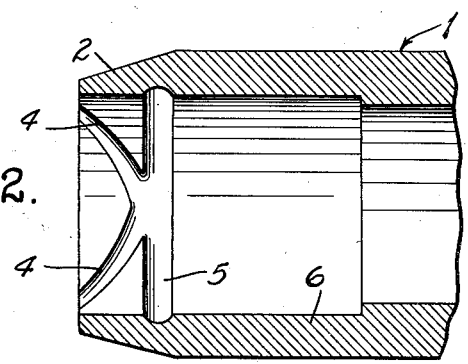

In all of the embodiments heretofore described, the helical groove 4 has been so positioned as to go with a clockwise rotation of the pipe 3. Fig. 11, by way of example, shows that the helical groove 4 may similarly be provided and adapted for counterclockwise rotation of the pipe 3 in drawing in the locking wire 10. Fig. 12 illustrates a fitting that has two helical grooves 4 provided, one for clockwise and the other for counterclockwise rotation.

It will be understood that the various alternatives proposed may be used singly in conjunction in one fitting.

In view of the above, it will be seen that the several objects of the invention are achieved and other advantageous results attained.

As many changes could be made in carrying out the constructions without departing from the scope of the invention, it is intended that all matter contained in the above description or shown in the accompanying drawings shall be interperted as illustrative and not in a limiting sense.

We claim:

1. A joint comprising a fitting having a socket, a thin-walled metallic entering member telescopingly received in said socket, said socket having a preformed interior encircling groove at least a portion of which is helical, and the remainder of which is annular, a locking member in the annular portion of said groove and engaging the entering member in such manner as to form an oppositely faced groove therein, with a bead on the interior of the entering member, and a film of solidified sealing material occupying the interfacial region between said socket and said entering member.

2. A joint comprising a fitting having a socket, a thin-walled metallic entering member telescopingly received in said socket, said socket having a preformed interior annular groove, and at least one preformed helical groove connecting the end of said socket and said annular groove, a locking member introduced through said helical groove and positioned in said annular groove and engaging the entering member in such manner as to form an oppositely faced annular groove therein, with an annular bead on the interior of the entering member, and a film of solidified sealing material occupying the interfacial region between said socket and said entering member.

3. A joint comprising a fitting having a socket, a thin-walled metallic entering member telescopingly received in said socket, said socket having a preformed interior annular groove, and at least one preformed helical groove connecting the end of said socket of said annular groove, a wire locking member introduced through said helical groove and positioned in said annular groove and engaging the entering member in such manner as to form an oppositely faced annular groove therein, with an annular bead on the interior of the entering member, said helical groove being at least as deep as the diameter of said locking member, and a film of solidified sealing material occupying the interfacial region between said socket and said entering member.

HAROLD K. RADER.
FRANCIS J. WILSON.